Oct. 24, 1967 H. B. SHAPER 3,349,194

MAGNETIC PHONOGRAPH PICKUP UTILIZING OFF CENTER MOUNTING OF ARMATURE

Filed Dec. 31, 1962 3 Sheets-Sheet 1

INVENTOR
HARRY B. SHAPER

BY

OSTROLENK, FABER, GERB & SOFFEN
ATTORNEYS

INVENTOR.
HARRY B. SHAPER
BY
OSTROLENK, FABER, GERB & SOFFEN
ATTORNEYS

Oct. 24, 1967 H. B. SHAPER 3,349,194

MAGNETIC PHONOGRAPH PICKUP UTILIZING OFF CENTER MOUNTING OF ARMATURE

Filed Dec. 31, 1962 3 Sheets-Sheet 3

INVENTOR.
HARRY B. SHAPER

BY

OSTROLENK, FABER, GERB & SOFFEN
ATTORNEYS

United States Patent Office 3,349,194

Patented Oct. 24, 1967

3,349,194

MAGNETIC PHONOGRAPH PICKUP UTILIZING OFF CENTER MOUNTING OF ARMATURE

Harry B. Shaper, East Hills, N.Y., assignor to Dyna-Empire, Inc., Garden City, N.Y., a corporation of New York Filed Dec. 31, 1962, Ser. No. 248,586
10 Claims. (Cl. 179—100.41)

ABSTRACT OF THE DISCLOSURE

A stereophonic magnetic phonograph pickup having a permanent magnet armature mounted for vibration within a magnetic gap common to individual electromagnetic systems for each stereo channel is constructed with the armature positioned below the axis of the gap to compensate for undesired components of upward vertical movement which normally result in cross talk. The pickup is provided with a separable two part body with the front part having a diagonal through passage coextensive with the common gap, wherein a replaceable stylus assembly is removably inserted from the rear. Securement of the body parts is effective to capture the stylus assembly in operative position and prevent accidental displacement thereof.

The instant invention relates to phonograph pickup cartridges in general and more particularly to a magnetic phonograph pickup cartridge for the reproduction of stereophonic signals.

In order to authentically reproduce signals recorded in the sound grooves of disk-type phonograph records it has been found that the pickup cartridge must have a high stylus compliance, must require a very low tracking force and must produce low cross talk. It has also been found that there must be a low dynamic mass for the moving elements of the cartridge. In the case of stereophonic reproduction, it is necessary that the cartridge achieve good channel separation and it is further required that there be no magnetic attraction to steel members in the vicinity of the cartridge and that the cartridge be so constructed that there is freedom from hum pickup. Phonograph cartridges of the prior art have achieved the foregoing features in varying degrees, but never to the overall extent achieved by the construction of the instant invention.

The cartridge of the instant invention operates on the moving magnet principle. That is, ripples in the record groove swing the stylus supporting shoe from side to side thereby moving a small permanent magnet attached to the shoe. Coils are mounted close enough to the magnet to pick up changes in its magnetic field which occur when the magnet is moved. The direction of magnet movement by the stylus determines whether the signals generated in the coils are from one channel or the other of the record groove with the magnitude of movement determining the amplitude of the signals.

In order to achieve freedom from hum pickup the cartridge is provided with a mumetal shield. Only a minimal portion of the cartridge extends beyond the shield.

In order to achieve superior channel separation the permanent magnet is mounted in a novel position between the pole faces of the magnetic structure. That is, the magnet in its inactive position is not centered between the pole faces. Instead the magnet is located closer to the lower poles than to the upper poles. With this construction it has been found that the effect of the vertical component of magnet motion, normally coupled into both channels to produce cross talk, is substantially eliminated.

In addition to the features hereinbefore described the cartridge of the instant invention is provided with a removable stylus assembly. The assembly is mounted in such a manner that even though it may be readily replaced, once it is in operating position it will remain in this position until its position is intentionally changed. This is achieved by providing a two piece body for the cartridge with the pieces being held together by a clamping screw. The forward body piece is provided with a diagonal guide aperture through which the stylus assembly extends being inserted from the rear forwardly and downwardly. The rear of the stylus assembly is provided with a cap having a front seating portion which abuts a seating surface in the forward piece of the cartridge. With the two cartridge pieces fastened together by the clamping screw a seating surface of the second cartridge piece engages the rear of the stylus assembly cap thereby fixing the position of the stylus assembly in a positive manner.

Accordingly, a primary object of the instant invention is to provide a novel construction for a phonograph pickup cartridge.

Another object is to provide a phonograph pickup cartridge having superior operating characteristics including high stylus compliance, low stylus talk, low tracking force, good channel separation, low dynamic mass and freedom from hum pickup.

Still another object is to provide a phonograph pickup cartridge having a novel arrangement for mounting a replaceable stylus assembly.

A further object is to provide a stereophonic phonograph pickup cartridge operating on the moving magnet principle with the magnet being mounted in novel relationship with respect to the pole faces of the magnetic circuit.

A still further object is to provide a phonograph pickup cartridge in which the metal shielding is constructed to provide substantially complete freedom from hum pickup.

These as well as further objects of this invention shall become readily apparent after reading the following description of the accompanying drawings in which.

Figure 1:
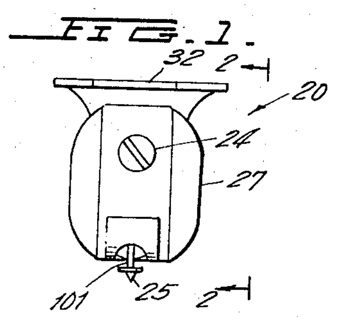
FIGURE 1 is a front elevation of a phonograph pickup cartridge constructed in accordance with the teachings of the instant invention.
Figure 2:
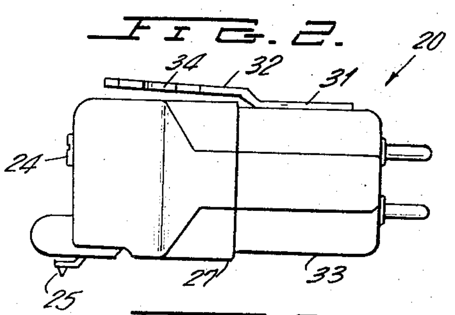
FIGURE 2 is a side elevation looking in the direction of arrows 2—2 of FIGURE 1.
Figures 3, 4, 5, 6:
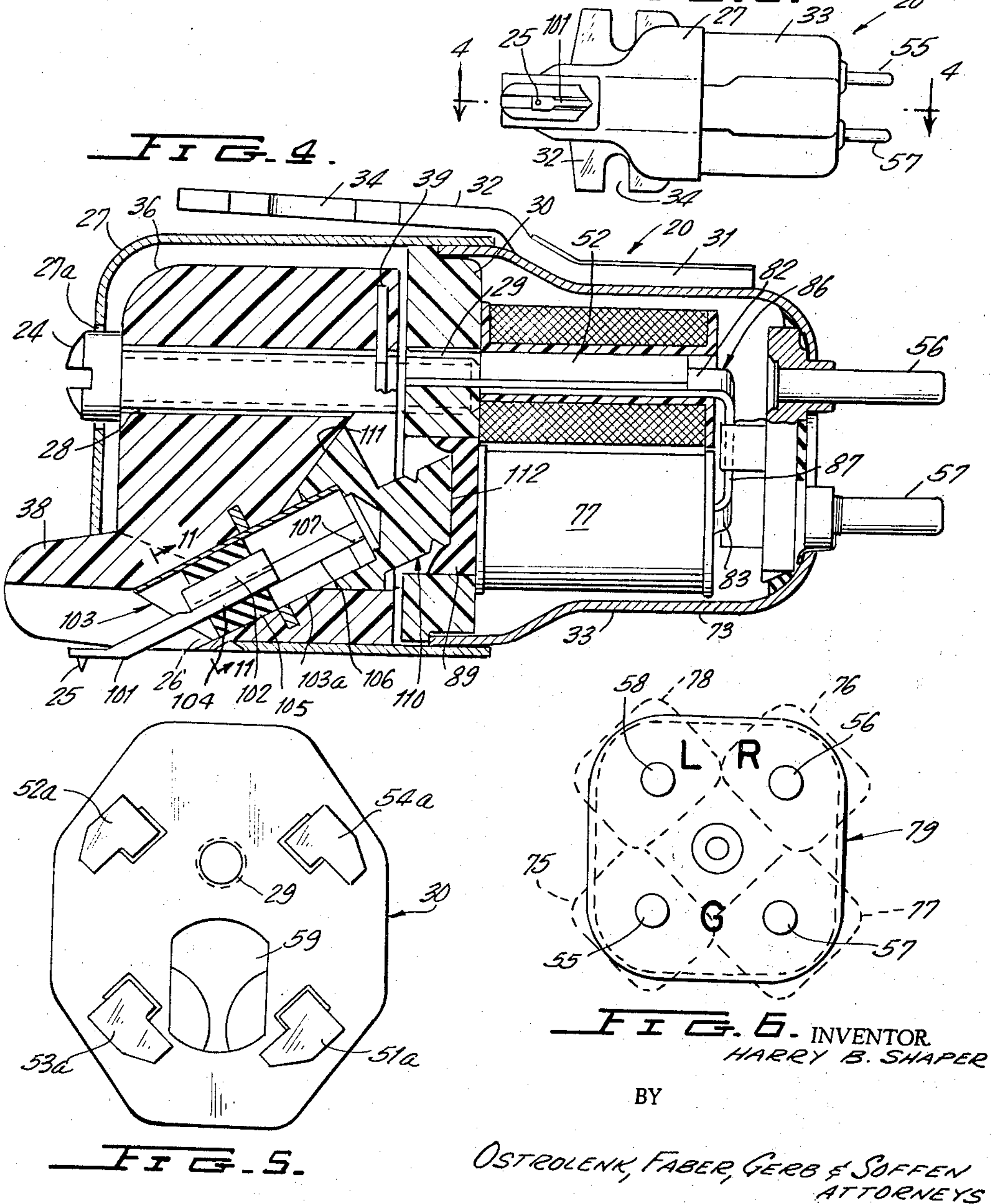
FIGURE 3 is a bottom view of FIGURE 2.
FIGURE 4 is a longitudinal cross-section taken through line 4—4 of FIGURE 3 looking in the direction of arrows 4—4.
FIGURE 5 is an elevation looking at the front of the insulating cover for the rear body portion of the cartridge.
FIGURE 6 is a rear elevation of the prong support member showing the relationship of the pickup coils.

Now referring to the figures. Stereophonic phonograph pickup cartridge 20 consists of three main assemblies 21, 22, 23 (FIGURE 7) held together in operative relationship by clamping screw 24. Stylus 25 is at the forward end of elongated stylus assembly 22 (FIGURE 7) which extends through aperture 26 in the front assembly or front body portion 21. Aperture 26 is a diagonal opening extending forward and downward from the rear of front body portion 21. The forward end of rear assembly or rear body portion 23 extends slightly into the rear end of front assembly metal housing 27. Clamping screw 24 extends through aperture 28 from front to rear of front body portion 21 being received by threaded aperture 29 in the insulating cover 30 at the front of rear body portion 23. Rear portion 31 of mounting bracket 32 is welded to housing 33 of rear body portion 23. The forward end of bracket 32 is off-set upwardly out of the plane of rear portion 31 and is provided with aligned slots 34, 35 which receive screws (not shown) for mounting cartridge 20 in a manner well-known to the art.

Front assembly 21 (FIGURE 8) includes molded insulating support 36 in which pole piece assembly 37 is encapsulated. Support 36 is disposed within housing 27 with the guard portion 38 at the forward lower end of support 36 disposed external of housing 27. Quadrature pole structure 37 consists of ferromagnetic pole pieces 41 through 44 each secured at one end thereof, as by welding, to frame 39 so that the free ends thereof are arranged in diamond or quadrature form. Frame 39 is constructed of a low permeability material such as stainless steel. Ends **41*a* through 44*a* of pole pieces 41 through 44, respectively, which are secured to frame 39 are turned and are flush with the back surface 45 of insulating support 36 so as to be directly engageable with turned ends 51*a* through 54*a* of pole pieces 51 through 54, respectively (FIGURE 10) of rear body portion 23**.

Figures 7, 8, 9, 10:
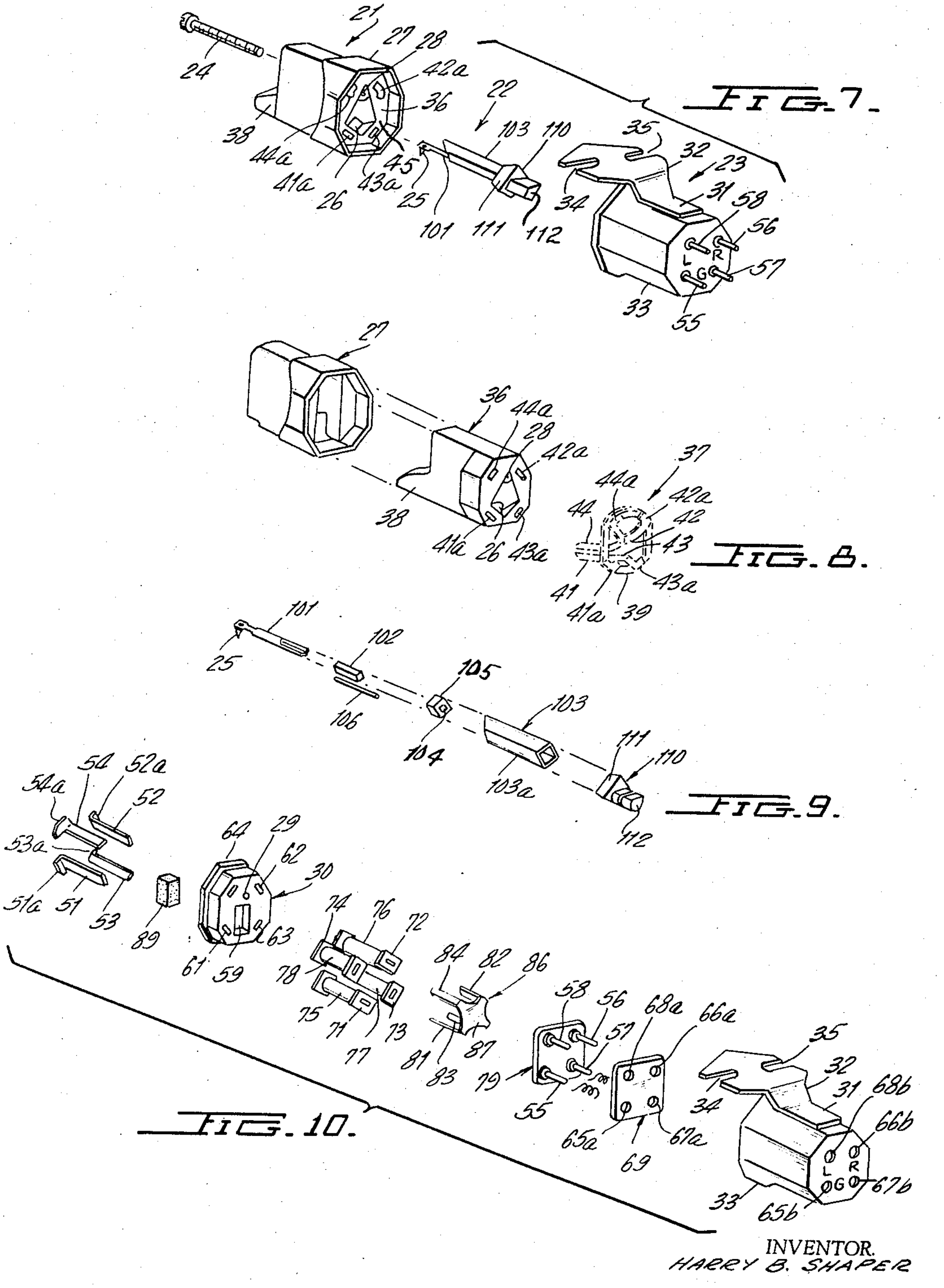
FIGURE 7 is an exploded perspective of the phonograph pickup cartridge illustrated in FIGURES 1 through 6.
FIGURE 8 is an exploded perspective of the elements constituting the front body portion of tthe cartridge.
FIGURE 9 is an exploded perspective of the elements constituting the removable and replaceable stylus assembly.
FIGURE 10 is an exploded perspective of the elements constituting the rear body portion of the cartridge.

Now referring more particularly to FIGURE 10. Pole pieces 51 through 54 extend through apertures 61 through 64, respectively, in cover 30 with ends **51*a* through 54*a* being positioned on the forward side of cover 30. After passing through apertures 61 through 64, pole pieces 51 through 54 enter the central apertures of coil forms 71 through 74, respectively, through the forward ends of these apertures. The four arms 81 through 84 of pole piece 86 extend forwardly of connecting portion 87 into the apertures of coil forms 71 through 74, respectively, through the rear ends thereof into intimate contact with pole pieces 51 through 54**, respectively.

Pole piece 86 is cemented at connecting portion 87 to insulating support plate 79. Prongs 55 through 58 extend rearwardly from plate 79 and form the terminals for coils 75 through 78 wound about coil forms 71 through 74, respectively. Prongs 55 through 58 extend through apertures **65*a* through 68*a*, respectively, in insulating cushion 69 and also extend through apertures 65*b* through 68*b*, respectively, at the rear of housing 33. Resilient bearing block 89 is positioned at the rear of aperture 59 in cover 30 for a reason to be hereinafter explained. A plastic insulating cement injected into housing 33** after assembly of the elements therein maintains these elements in operative position.

Removable and replaceable stylus assembly 22 (FIGURE 9) comprises stylus 25 mounted at the forward end of aluminum shoe 101 with bar shaped permanent magnet 102 being mounted at the rear of shoe 101. The forward end of shoe 101 extends beyond the forward end of diamond cross-sectioned sleeve 103 constructed of low permeable material such as brass. Magnet 102 extends through aperture 104 of elastomer member 105 which is closely fitted within sleeve 103 and serves to establish the inactive position of permanent magnet 102 relative to the walls of sleeve 103. Elastomer 105 provides motion damping and restoring effects for magnet 102. Retaining wire 106 is positioned with its forward end extending into aperture 104, interposed between elastomer 105 and magnet 102 and being cemented to the latter. The rear end of wire 106 is cemented or otherwise secured to the deformed portion 107 at the rear of sleeve 103. Wire 106 provides some guidance and restoring effects for magnet 102. Insulating cap 110 is mounted to sleeve 103 at the rear of deformed portion 107.

Starting with the elements arranged as in FIGURE 7, cartridge 20 is assembled by inserting the forward end of stylus assembly 22 into aperture 26 until tapered cap shoulder 111 abuts the tapered seating portion of insulating support 36 at the rear of aperture 26. Thereafter, the forward end of rear body portion 23 is inserted into the rear end of housing 27 with the rear surface 112 of cap 110 engaging bearing block 89. Clamping screw 24 is then inserted through aperture **27*a* at the forward end of housing 27, through aperture 28 and is received by the threads of aperture 29 in rear body portion cover 30. Tightening of clamping screw 24 causes body portions 21 and 23 to converge thereby forcing bearing block 89 against cap end 112 which in turn firmly seats shoulder 111 against insulating support 36**.

It is noted that the free ends of pole pieces 41 through 44 constitute quadrature pole faces positioned parallel to the faces of permanent magnet 102. Further these pole faces constitute partial boundaries for aperture 26. The forward end of sleeve 103 is diagonally cut and the corner **103*a* thereof is open. Thus, as stylus assembly 22 is inserted into aperture 26 the close fit between sleeve 103 and aperture 26 causes the outer surfaces of sleeve 103 to engage the pole faces of pieces 41 through 44. In this manner the inactive position of permanent magnet 102 relative to the faces of pole pieces 41 through 44** is accurately established.

As should be obvious to those skilled in the art, with cartridge 20 assembled, two parallel magnetic paths are present for the flux generated by permanent magnet 102. These paths are so similar that only one shall be described. One such path extends from magnet 102 through elastomer 105 to the pole face end of piece 41, through pole piece 41 to exposed end **41*a* thereof. End 41*a* abuts portion 51*a* at the exposed forward end of pole piece 51 with the magnetic path extending through piece 51, through arm 81 of pole piece 86 in intimate contact with pole piece 51, through connecting portion 87 and arm 82 in intimate contact with pole piece 52, through pole piece 52 to exposed end portion 52*a* thereof in intimate contact with exposed end portion 52*a* of pole piece 52, and through pole piece 42 to its pole face end and through elastomer 105 to permanent magnet 102**.

Figure 11:
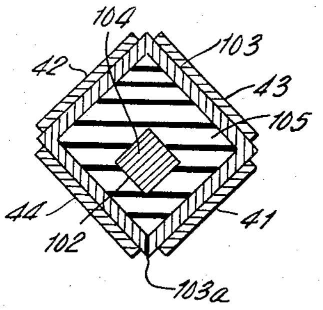
FIGURE 11 is a cross-section taken through line 11—11 of FIGURE 4 looking in the direction of arrows 11—11, showing the relationship between the pole faces and the elements surrounded thereby for the inactive position of the magnet.

As clearly seen in FIGURE 11, while the faces of permanent magnet 102 are parallel to the pole faces of pole pieces 41 through 44 the gaps between opposed pole faces and magnet 102 are not equal. That is, the gaps between pole face 41 and magnet 102 and between pole face 44 and magnet 102 are less than the gaps between pole face 42 and magnet 102 and pole face 43 and magnet 102. This is brought about by placing elastomer aperture 104 in an off center position. Thus, the longitudinal axis of permanent magnet 102 is off center with respect to the pole faces 41 through 44. It has been found that with this arrangement cross talk is substantially reduced.

Figure 13:
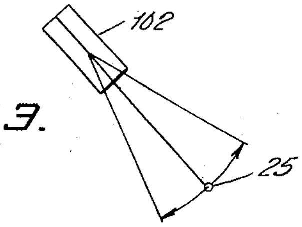
FIGURES 12 through 17 are schematics for comparing the operation of a magnet centered between the pole faces, as in the prior art, with a magnet positioned in accordance with the teachings of the instant invention.
Figure 12:
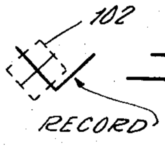
Figures 14, 15:
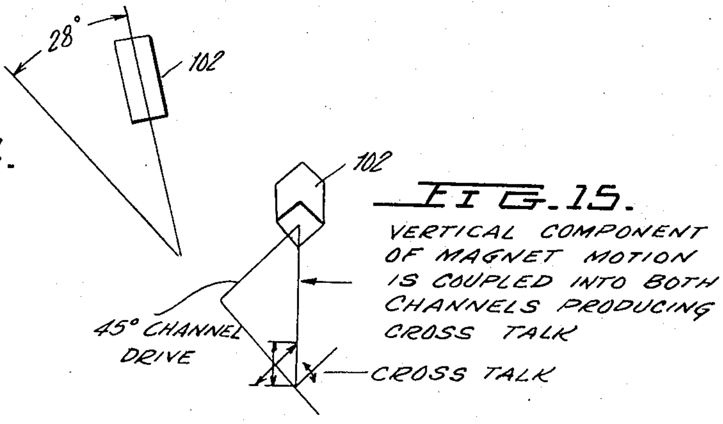

This highly desirable result appears to be achieved because of the following. If magnet 102 were to be positioned in the plane of the record being played (FIGURES 12 and 13) magnet motion would be confined to a horizontal plane and there would be no cross talk. However, as seen in FIGURES 14 and 15, the axis of magnet 102 is typically inclined at an angle of 28° with respect to the record surface, and in commercial stereophonic recording the channels are disposed at 45° with respect to the vertical. Thus, there is produced a vertical component of magnet motion producing an unwanted signal coupled into both channels to produce cross talk.

Figure 16:
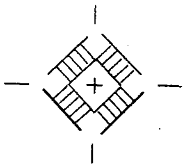
Figure 17:
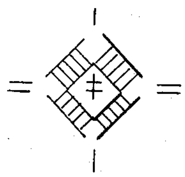

In prior art devices the magnet was centered with respect to the pole structure to produce a symmetrical magnetic field as schematically illustrated in FIGURE 16. On the other hand, in the device of the instant invention the center of the magnet is below the center of the pole structure so that a non-symmetrical magnetic field is produced as in FIGURE 17.

When the magnet moves in a non-symmetrical field then a vertical displacement provides a signal which is small when compared with the rotational or 45° distortion. Thus, only a small vertical rotation factor is required to cancel the unwanted signal. This is obtained from the lack of symmetry in the relationship between the centered magnet and the off center magnetic field distortion. If the magnet is below center then the cancellation signal is of positive phase and if the magnet is above center the cancellation signal is of negative phase.

This off center positioning of the moving magnet provides an economical and effective means for substantially eliminating cross talk.

Thus, this invention provides a stereophonic pickup cartridge which achieves improved overall performance when compared to similar devices of the prior art. In particular, hum is substantially reduced by providing a casing of magnetic shielding material such as mumetal, which is so constructed that only the circuit connecting prongs together with minimal portions of the stylus assembly and the insulating support extend outside of this housing. Further, in the cartridge of the instant invention a removable and replaceable stylus assembly is mounted in such a way that faithful reproduction and long life is achieved. Still further, the off center mounting of the permanent magnet in relation to the pole faces substantially eliminates cross talk.

Although there has been described a preferred embodiment of this novel invention many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. An armature-stylus assembly adapted to be removably mounted in a recess extending through a common gap defined by pole faces of first and second electromagnetic systems in a magnetic pickup cartridge for transducing signals from a record sound groove having first and second channels diagonally offset in opposite directions from a horizontal plane; said assembly comprising an elongated sleeve having a longitudinal axis adapted to be centered in such common gap when said assembly is mounted in operating position; an elongated movable subassembly disposed within said sleeve; bearing means engaging a portion of said subassembly and supporting said subassembly for angular vibration; said subassembly including a stylus at one end thereof and an armature disposed remote from said one end; said stylus extending beyond the confines of said sleeve through a first end thereof and adapted to transmit vibrations to said armature; said bearing means including an elastomer; said stylus including a downwardly facing tip; said bearing means positioning said portion of said subassembly downwardly off-center with respect to the longitudinal axis of said sleeve.

2. An assembly as set forth in claim 1 in which there is means at a second end of said sleeve engageable for removal of the assembly through the rear of the recess.

3. An assembly as set forth in claim 1 in which there is a metal spring connected between said sleeve and said subassembly.

4. An assembly as set forth in claim 1 in which said elastomer includes an exterior surface in engagement with the interior surface of said sleeve; said elastomer having an aperture through which said subassembly extends.

5. A phonograph pickup for transducing signals from a record sound groove having first and second channels diagonally offset in opposite directions from a horizontal plane; said pickup including a body means having an elongated recess; first and second electromagnetic systems each having pole face means; said pole face means of both of said systems combining to define a gap common to both of said systems with said recess extending through said gap with the longitudinal axis of said recess centered in said gap; an elongated subassembly; bearing means engaging a portion of said subassembly and supporting said subassembly for angular vibration within said recess; said subassembly including a stylus at one end thereof and an armature disposed remote from said one end and extending into said gap; said stylus extending beyond the confines of said recess through a lower end thereof and including a downwardly facing tip; said bearing means positioning said portion of said subassembly downward off-center with respect to the longitudinal axis of said recess to compensate for unwanted components of upward vertical movement of said armature during vibration of said subassembly.

6. A phonograph pickup as set forth in claim 5 in which the pole face means of each of said systems includes opposed pole faces; said pole faces positioned edge to edge and equally spaced from each other with opposed pole faces of the first system interposed between opposed pole faces of the second system; said pole faces of each of said systems disposed with the longitudinal axis of said recess extending therebetween; said subassembly mounted in the recess with said portion of said subassembly being disposed downward off-center with respect to the opposed pole faces of both the first and second systems.

7. A phonograph pickup as set forth in claim 6 in which the pole faces are planar with each of said pole faces disposed at right angles to those of said pole faces adjacent thereto.

8. A phonograph pickup as set forth in claim 5 also including an assembly comprising said subassembly and a support member to which said subassembly is secured; said recess including an upper end through which said assembly is removable from said body.

9. A phonograph pickup as set forth in claim 8 in which the stylus extends beyond one end of said support member, additional means at the other end of said support member engageable for removal of said assembly from said body, said additional means cooperating with a formation of said body to limit insertion of said assembly into said recess.

10. A phonograph pickup as set forth in claim 9 in which said body comprises a front portion and a rear portion, fastening means separably connecting said front and rear portions, said recess extending through said front portion with said lower end of of said recess at the bottom of said front portion and the upper end of said recess at the rear of said front portion, said fastening means urging the front of said rear portion against said additional means to urge the latter against said formation.

References Cited

UNITED STATES PATENTS

| | | | |
|---|---|---|---|
| 3,060,281 | 10/1962 | Snepvangers ------ | 179—100.41 |
| 3,146,319 | 8/1964 | Stanton ---------- | 179—100.41 |

BERNARD KONICK, *Primary Examiner.*

IRVING SRAGOW, *Examiner.*

R. J. GARBACIK, L. H. HILL, *Assistant Examiners.*